Patented Jan. 9, 1940

2,186,202

UNITED STATES PATENT OFFICE 2,186,202

PRESERVATION OF LATEX

John McGavack, Leonia, N. J., assignor, by mesne assignments, to United States Rubber Company, New York, N. Y., a corporation of New Jersey No Drawing. Application August 10, 1937, Serial No. 158,337

6 Claims. (Cl. 260—820)

This invention relates to improvements in methods of preserving latex and the products thereof.

Latex is commonly preserved today with from 1 to 1.25% ammonia. The ammonia in such latex functions both as the basic material for rendering the latex alkaline to the proper degree, and also as a germicidal agent for preventing bacterial growth and the consequent development of acid in the latex which would result in coagulation. While ammonia is a satisfactory base for producing the desired alkalinity, its germicidal properties are so feeble that, if it is to act also as the germicidal agent, it must be used in concentrations greatly in excess of those necessary to otherwise merely obtain a satisfactory alkalinity.

The present invention relates to the preservation of latex with smaller amounts of ammonia than generally used in latex preservation procedures where ammonia is the sole preservative.

In carrying out the present invention, latex is preserved against putrefaction and coagulation by the addition thereto of small amounts of an alkyl mercuric ester, such as ethyl mercury chloride, in combination with ammonia or other base. The alkyl mercuric ester acts as a germicidal agent, and from .01 to .1 part of the ester per 100 parts of latex is the preferred range for preventing bacterial growth. Larger amounts of alkyl mercuric esters, of course, may be added but proportions in excess of .1% are deemed unnecessary. While ethyl mercury chloride is the present preferred embodiment of the alkyl mercury ester for commercial reasons, other esters, such as ethyl mercury oleate, ethyl mercury phosphate, ethyl mercury sulphate, ethyl mercury nitrate, and similar alkyl mercury esters with other alkyl radicals than the ethyl radical, for example, methyl, propyl, isobutyl, may be used, preferably, as above described, in amounts from .01 to .1%. The addition of .2 to .75 part ammonia per 100 parts latex has been found sufficient ammonia for proper preservation of latex in the presence of alkyl mercury esters. Other bases than ammonia, for example, fixed alkalies, such as sodium and potassium hydroxides, and water-soluble organic derivatives of ammonia, for example, basic amines, such as the mono-, di- and tri-alkyl amines, preferably in amounts ranging from .2 to .5%, may be used in conjunction with the ethyl mercury ester which, as in the case of its use with ammonia as described above, is preferably present in amounts ranging from .01 to .1%. The combination of alkyl mercury ester and base may be used to preserve fresh latex as it comes from the trees for shipment to various countries. The combination may also be used to preserve a latex that has already been exported from plantation countries with another type of preservative after freeing such latex from its original preservative. For example, a latex exported from plantation countries with the usual 1 to 1.25% ammonia can, if desired, be substantially freed of its ammonia after arrival at its destination as by blowing air through it and re-preserved with small amounts of alkyl mercury ester and base as above described.

The alkyl mercury esters are very poisonous and generally when sold are diluted with a large amount of inert material such as ammonium or sodium sulphate. As a rule the materials on the market contain not more than 3 or 4% of the active ingredient. The material as obtained may be added to the latex mixed with water in which the carrier as above would be soluble and in which the alkyl mercury ester is easily dispersed. If the inert carrier for the alkyl mercury ester is insoluble in water, the whole may be dispersed in water prior to adding it to the latex. The desired amount of ammonia or other base may, if desired, be added to the solution or suspension of the alkyl mercury ester and inert material prior to its addition to the latex.

Latex as it comes from the tree, to which has been added .2 part ammonia per 100 parts of the latex, will coagulate in 3 days. Portions of the same latex containing .2% ammonia and to which are added .01% ethyl mercury chloride and .1% ethyl mercury chloride, respectively, will remain stable for extended periods of time. Fresh latex to which is added as much as .75 part of ammonia per 100 parts of latex may develop a bad odor and have a reduced stability within six months. The same latex containing .75% ammonia and .1 part of ethyl mercury chloride develops no off-odor and has a much higher stability than latex without the alkyl mercury ester in this period of time.

It is thus seen that the use of small amounts of alkyl mercury esters in latex preservation processes permits a reduction in the amount of ammonia over that used where the ammonia is the sole preservative. The ammonia may also be satisfactorily replaced by other bases which impart the desired alkalinity to the latex in the presence of the alkyl mercury ester.

It is obvious that various modifications will suggest themselves to persons skilled in the art and it is not desired to limit the invention otherwise than as set forth in the appended claims.

Having thus described my invention, what I claim and desire to protect by Letters Patent is:

1. Latex containing .01 to .1% of an alkyl mercury ester and a small amount of a base from the group consisting of ammonia, water-soluble organic derivatives of ammonia, and fixed alkalies.

2. Latex containing .01 to .1% alkyl mercury ester and .2 to .75% ammonia.

3. Latex containing .01 to .1% alkyl mercury chloride and .2 to .75% ammonia.

4. Latex containing .01 to .1% ethyl mercury chloride and .2 to .75% ammonia.

5. Latex containing .01 to .1% alkyl mercury ester and .2 to .5% of an alkyl amine.

6. Latex containing .01 to .1% alkyl mercury ester and .2 to .5% of an alkali metal hydroxide.

JOHN McGAVACK.